UNITED STATES PATENT OFFICE.

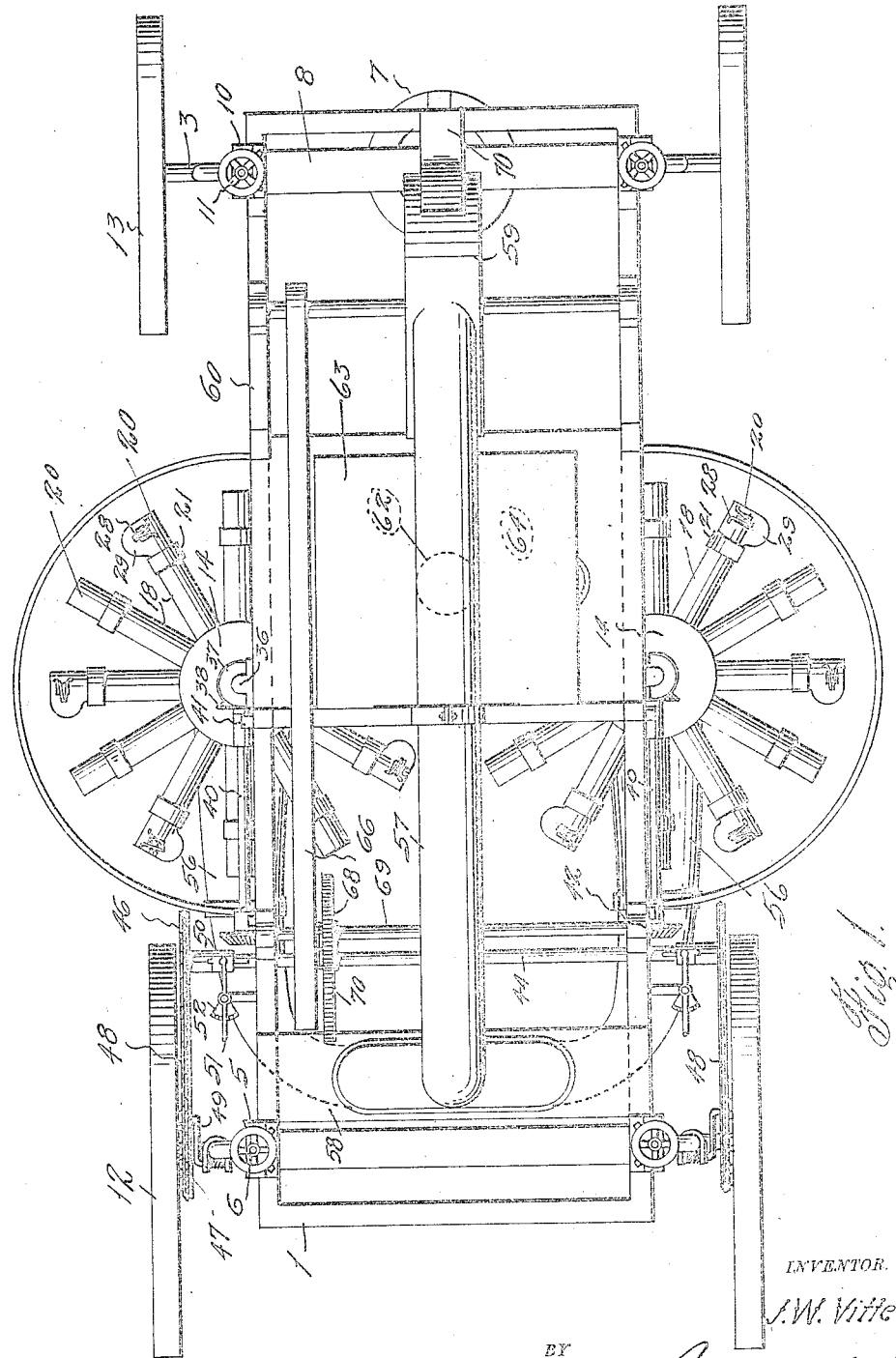

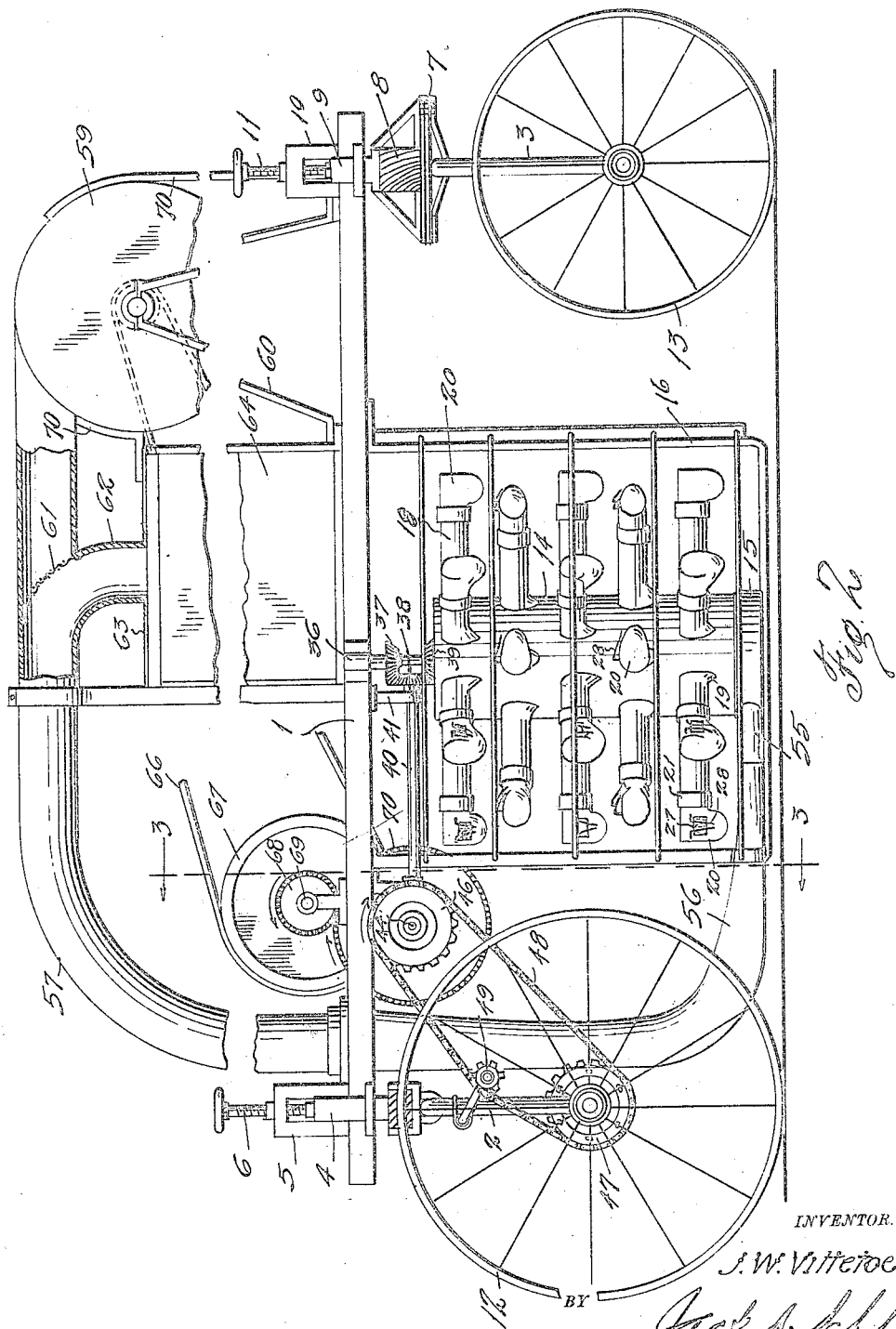

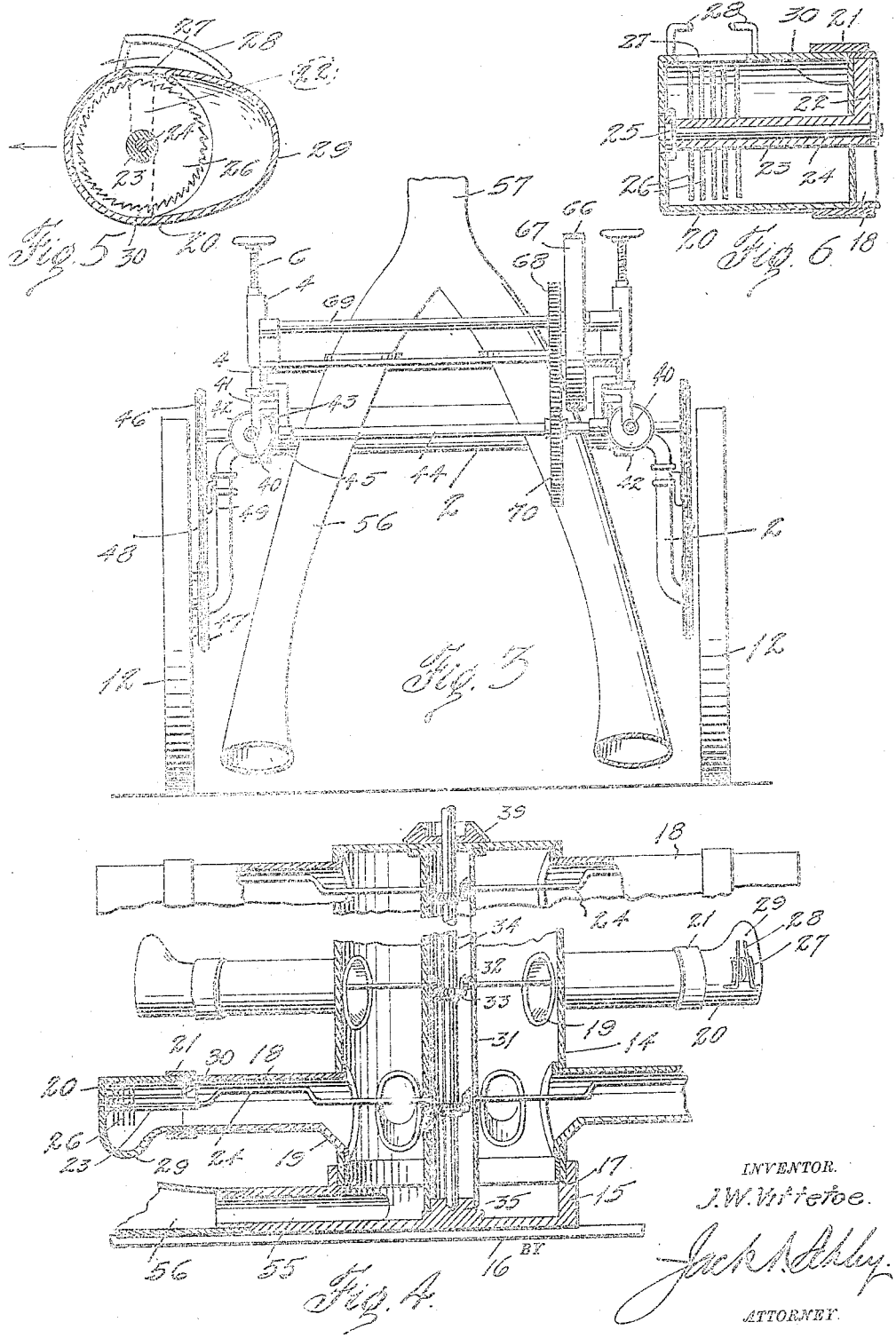

JAMES W. VITTETOE, OF MART, TEXAS.

COTTON-PICKER.

1,225,188.

Specification of Letters Patent.   Patented May 8, 1917.

Application filed October 26, 1916.   Serial No. 127,948.

*To all whom it may concern:*

Be it known that I, JAMES W. VITTETOE, citizen of the United States, residing at Mart, in the county of McLennan and State of Texas, have invented certain new and useful Improvements in Cotton-Pickers, of which the following is a specification.

This invention involves means for mechanically picking cotton through the agency of picking members thrust into the plant so as to engage the lint which is conveyed to a point of collection by means of a suction creating fan.

In carrying out the invention a hollow member is arranged to enter the plant laterally and provided with means for engaging and removing the lint from the boll. This member coöperates with a vacuum creating device whereby the lint is conveyed from the member by suction to a suitable collecting receptacle.

A more specific embodiment of the invention comprises a portable frame carrying a pair of opposed vertical drums having radial arms. Means is provided for revolving the drums whereby the arms of one are swung toward those of the other drum and the plants are penetrated from each side of the row. Revolving heads are mounted on the outer ends of the arms and formed so as to engage only the lint, permitting the bolls, leaves and stems to remain intact.

The arms are made hollow to form conductors for the picked lint which is drawn into the arms and drums by suction. A suitable vacuum creating device is mounted on the frame and connected with the drums and a receptacle so as to convey the lint or cotton to a point of discharge over the receptacle.

One of the particular features of the more specific embodiment of the invention is the construction of the hollow arms in connection with the drum and the revolving head. The drum revolves and the arms are fixed on the drum. Each arm has a head at its outer end, the latter having a restricted opening for admitting the cotton. Within the head is arranged serrated or roughened members which remain stationary with relation to the arms, while the head revolves around the said members and carries means for engaging the bolls so that the lint will be carried over said members which act thereon through the restricted opening. It is practically impossible for leaves or bolls to be pulled from the stems so that only the lint is removed.

The invention will be more readily understood from a perusal of the following specification and by reference to the accompanying drawings, in which an example of the invention is shown and wherein:

Figure 1 is a plan of the cotton picking apparatus,

Fig. 2 is a side elevation of the same, parts being broken away.

Fig. 3 is a transverse sectional view on the line 3—3 of Fig. 2,

Fig. 4 is a sectional detail of one of the drums,

Fig. 5 is a sectional detail of one of the heads, and

Fig. 6 is a longitudinal sectional view of the outer end of one of the arms.

In the drawings the numeral 1 designates a supporting frame mounted on a rear axle 2 and a front axle 3. The rear axle is arched and fixed to vertically adjustable hangers 4 mounted in yokes 5 secured to the frame. Adjusting screws 6 mounted in the yokes engage the hangers for adjusting the latter. The axle 3 is connected with a fifth wheel 7 which is attached to a cross timber 8. Hangers 9 fixed to the ends of timber 8 are mounted to slide vertically in a yoke 10 which carries a screw 11 engaging the hanger also. The axle 2 is mounted in wheels 12, while the front axle 3 is mounted in wheels 13. By adjusting the screws 6 and 11 the frame may be raised and lowered. It is obvious that any other adjusting means might be substituted and the particular construction of such means is not essential. Suitable means (not shown) may be employed for propelling the apparatus.

Under the central portion and at each side of the frame is mounted a vertical revolving drum 14. As the drums are duplicates a description of one will suffice for both. As shown in detail in Fig. 4 the drum is supported in a cast metal circular base 15 fastened on the bottom member of a U-shaped hanger 16 having its upper ends secured to the underside of the frame. The upper edge of the base 15 is internally shouldered to form a bearing 17 for the lower end of the drum cylinder. A plurality of tubular arms 18 are mounted at various elevations on the drum and in staggered relation vertically of said drum. Each arm at its intersection with the drum has its under side flared downward toward the drum at 19 for the purpose of permitting a free discharge into the drum.

Each arm has mounted on its outer end a revolving head 20. A collar 21 fastened to the end of the arm overlaps the head and forms a bearing for the latter. A description of one arm and its head will do for all. A radial bracket 22 projects from the end of the arm within the same and carries an outwardly projecting integral sleeve 23 extending into the head, centrally of the same. A shaft 24 extends through the sleeve from the arm and has a head 25 which is fastened to the vertical outer wall of the head 20 so that when the shaft is revolved the head 20 is also revolved, the arm and sleeve remaining stationary. On the sleeve a plurality of disks 26 are mounted in close relation. These disks have toothed peripheries and their diameter is only slightly less than the inner diameter of the cylindrical portion of the head. In one side of the head is a restricted slot or opening 27 through which the teeth of the disks are exposed as the head revolves.

The head is formed with an enlarged boss or offset pocket 29 in juxtaposition to the opening 27. A pair of gathering fingers 28 having an angular formation as shown, are secured to the head so as to extend across the opening and both converge toward each other as well as being curved downward as shown in Fig. 5. As the head is swung into the cotton plant it is revolved toward the plant whereby the higher and wider portion of the fingers is presented to the bolls. When a boll is caught under the fingers the slot or opening 27 is always next to the lint which is pressed down onto the teeth of the disks 26. The teeth are pointed so that the lint catches thereon as the arm is swung, but the head removes the lint as it revolves. The boll and leaves will pass out from under the fingers while the cotton will be drawn down into the pocket by suction as hereinafter described. Any leaves, bolls or stems will not enter the slot 27 but will ride over the smooth edge and surface of the pocket 29. A plate 30 at the bracket 22 closes a portion of the outer end of the arm as shown in Fig. 5 so that the lint will not be drawn around said bracket and the shaft 24 is offset to both agitate the lint passing through the arm and prevent its winding around said shaft.

A tubular casing 31 extends vertically through the center of the drum. A central vertical shaft 34 has its lower end bearing in a spindle bearing member 35 which also supports the lower end of the casing. On this shaft are fixed bevel gears 33 each of which meshes with a bevel pinion 32 fixed on the end of one of the shafts 24. The shaft 34 passes up through the top of the drum and engages in a bearing bracket 36. Also on this shaft is fixed a bevel driving gear 37 which meshes with a bevel gear 38 which in turn meshes with a bevel gear 39 fixed on the top of the drum. While the drum and the shaft 34 revolve in opposite directions, the relation of the pinions 32 and gears 33 is such as to cause the shafts 24 and the heads 20 attached thereto to revolve toward the plants.

The gear 38 is fixed on the end of a shaft 40 suspended under the frame in brackets 41. The shaft carries at its rear end a bevel gear 42 which meshes with a bevel gear 43 fixed on a shaft 44 mounted transversely under the frame in brackets 45. The outer ends of this shaft extend beyond the sides of the frame 1 and carry loosely mounted sprocket wheels 46 which are driven from sprocket wheels 47 mounted on the ground wheels 12, by means of endless chains 48. Spring pressed idler sprockets 49 supported on the axle 2 engage the chains and take up the slack when the frame 1 is adjusted. Clutch sleeves 50 splined on the shaft 44 are adapted to engage the clutch hubs of the sprocket wheels 46. These sleeves are thrown into and out of engagement with the hubs by means of levers 51 pivoted on segments 52 mounted on the frame. The transmission of motion from the chains to the shaft 44 may be thus interrupted.

As shown in Fig. 1 the drums with their arms present cylindrical picking members, the heads traveling in circles in such close proximity that that only room for the passage of the stalks of the plants is left between the two members. This assures that all portions of the plants will be acted upon. As many of the arms 18 may be used as is desired and they may be disposed as deemed best in constructing the machine. It is pointed out that each picking member should have the same peripheral velocity as the ground wheels 12 and in the drawings I have shown the members as having about the same diameter as that of the wheels 12; however it is not necessary that the diameters be the same as this result could be obtained by gearing.

As the machine moves forward the arms 18 are swung rearward over the rows and into the cotton plants. The forward movement of the machine will compensate the rearward movement of arms with relation to the plant, so that the arms will not swing through the plants, but will enter and exit from the same substantially radially. It is to be understood that the heads 20 may be geared to revolve as fast or as slow as is desired.

From the base 15 of each drum a hollow shank 55 extends rearward and is engaged by the forward end of one of the depending branches 56 of a lint flue or conveyer 57. The branches are supported by a plate 58 extending across the frame 1. The flue 57 leads forward over the center of the apparatus to a suction fan 59 mounted in supports 60 and secured by brackets 70. The passage of the cotton is obstructed by a screen 61 in the flue, whereby the cotton is deflected into a down spout 62 which is supported on a housing 63 in which a receptacle 64 is snugly fitted and into which the cotton is discharged. The receptacle may be removed when filled and emptied. The fan has a pulley 65 which is driven by a belt 66 from a larger pulley 67 mounted on a counter shaft 69 supported transversely of the frame. A pinion 68 fixed on this shaft is driven by a gear 70 mounted fast on the shaft 44.

In operation the machine is propelled or drawn along the row of cotton plants and as it proceeds the drums 14 are revolved so that their arms 18 are projected into the plants laterally. The heads 20 of the arms being revolved so as to present the open portion of the fingers 28 will pick the cotton lint which is caught on the disks 26 and later removed from the same into the pockets 29. The suction from the fan 59 draws the cotton through the arms 18 into the drums, through the shanks 55, branches 56, flue 57 and spout 62 into the receptacle 64. The cotton will be thoroughly picked and no leaves or bolls will be drawn into the heads 20 and the unmatured bolls will not be molested. Owing to the staggered relation of the arms, very few if any open bolls will be missed.

What I claim, is:

1. In a cotton picker, a portable support, a suction creating device mounted on the support, a conveyer connected thereto, and a revolving picking member communicating with the conveyer and including a plurality of radial conveyers each having a revolving cotton picking head on its outer end communicating with the radial conveyers.

2. A cotton picking member comprising a drum, radial hollow arms extending from the drum, revolving picking heads mounted on the outer ends of the arms and communicating therewith, and means for revolving the drum and the heads in combination with means for creating a suction through the heads and arms.

3. A cotton picking member comprising a revolving head having an opening, a roughened element within the head relatively fixed thereto and exposed by the opening, and means carried by the head for guiding cotton bolls over the opening.

4. A cotton picking member comprising a non-revolving arm, a revolving head mounted on the arm, a roughened cotton picking element carried by the arm within the head, the head having an opening exposing the roughened element, and means carried by the head for guiding cotton bolls over the opening.

5. Means for picking cotton which includes a cotton entangling element within a revolving member exposing only a portion of the element, a conveyer coöperating with the member and the element and means for creating a suction in the member and the conveyer.

6. In a cotton picker, the combination of a portable support, a vertical hollow drum carried by the support, hollow conveyer arms radiating from the drum, revolving cotton picking devices on the outer ends of the arms, means for revolving the drum and also for revolving the picking devices, and a suction creating device connected with the drum for removing picked cotton from the arms and the drum.

7. In a cotton picker, the combination of a portable support, a vertical revolving drum, hollow arms radiating from the drum and communicating therewith, a plurality of toothed disks fixed to the outer ends of the arms, revolving heads surrounding the disks and mounted on the arms, each head having an opening exposing a portion of the toothed peripheries of the disks, said heads communicating with the arms, means for creating a suction through the drum, arms and head, and means for conveying cotton from the drum.

8. In a cotton picker, the combination of a wheel supported frame, a pair of vertical revolving drums carried by the frame, radial conveyer arms carried by the drums, revolving picker heads mounted on the outer ends of the arms, cotton picking elements fixed to the arms within the heads, means for revolving the drums and also the heads, a suction creating device mounted on the frame, and a conveyer duct leading from the drums to the suction creating device and having a cotton outlet in advance of said device.

In testimony whereof I affix my signature.

JAMES W. VITTETOE.